US010150229B2

(12) United States Patent
Goering

(10) Patent No.: US 10,150,229 B2
(45) Date of Patent: Dec. 11, 2018

(54) CIRCUMFERENTIAL STIFFENERS FOR COMPOSITE FANCASES

(71) Applicant: Albany Engineered Composites, Inc., Rochester, NH (US)

(72) Inventor: Jonathan Goering, York, ME (US)

(73) Assignee: Albany Engineered Composites, Inc., Rochester, NH (US)

(*) Notice: Subject to any disclaimer, the term of this patent is extended or adjusted under 35 U.S.C. 154(b) by 0 days.

(21) Appl. No.: 15/799,959

(22) Filed: Oct. 31, 2017

(65) Prior Publication Data

US 2018/0050469 A1   Feb. 22, 2018

Related U.S. Application Data

(62) Division of application No. 13/658,578, filed on Oct. 23, 2012, now Pat. No. 9,833,930.

(51) Int. Cl.
*D03D 3/00* (2006.01)
*B32B 5/16* (2006.01)
(Continued)

(52) U.S. Cl.
CPC ............ *B29B 11/16* (2013.01); *F01D 21/045* (2013.01); *F01D 25/24* (2013.01);
(Continued)

(58) Field of Classification Search
CPC .................. F01D 21/045; F01D 25/24; F05D 2300/6012; F05D 2300/603;
(Continued)

(56) References Cited

U.S. PATENT DOCUMENTS

| 5,222,360 A | 6/1993 | Antuna et al. |
| 5,771,680 A | 6/1998 | Zahedi et al. |

(Continued)

FOREIGN PATENT DOCUMENTS

| CA | 2820415 A | 6/2012 |
| CN | 1413815 A | 4/2003 |

(Continued)

OTHER PUBLICATIONS

International Search Report and Written Opinion from the European Patent Office (acting as the ISA) for corresponding international application PCT/US2013/065874 dated Mar. 25, 2014.

(Continued)

*Primary Examiner* — Yan Lan
(74) *Attorney, Agent, or Firm* — McCarter & English, LLP

(57) ABSTRACT

Woven preforms, for example those used for jet aircraft engine fancases, may need additional stiffeners to improve the strength and/or dynamic performance of the preform assembly, as well as to serve as attachment points. The present invention describes several improved woven preforms that include circumferential or axial stiffeners, as well as methods of manufacturing the same. One embodiment includes circumferential stiffeners added to a woven preform. Another embodiment includes sub-preforms with integral flanges that combine to make integral stiffeners. A further embodiment includes an intermediate stiffener wrapped onto a base sub-preform wrap, wherein the intermediate stiffener wrap incorporates intermediate stiffeners. Another embodiment incorporates bifurcations in one or more layers of an outermost wrap of a multi-layer fabric composite that forms a preform, wherein the bifurcated outer wrap is folded to form stiffeners that may be oriented circumferentially or axially.

9 Claims, 7 Drawing Sheets

(51) Int. Cl.
*D05B 23/00* (2006.01)
*B32B 17/02* (2006.01)
*B32B 1/04* (2006.01)
*B32B 18/00* (2006.01)
*B29B 11/16* (2006.01)
*F01D 25/24* (2006.01)
*F01D 21/04* (2006.01)

(52) U.S. Cl.
CPC ............... *F05D 2300/603* (2013.01); *F05D 2300/6012* (2013.01); *Y02T 50/672* (2013.01); *Y10T 29/49826* (2015.01); *Y10T 428/13* (2015.01); *Y10T 428/1314* (2015.01); *Y10T 428/1362* (2015.01)

(58) Field of Classification Search
CPC ......... Y10T 29/49826; Y10T 428/1362; Y10T 428/13; Y10T 428/1314; B29B 11/16; Y02T 50/672; B32B 3/12; B32B 5/024; B32B 7/08; D03D 25/005; D03D 3/00
USPC .............. 428/34.5, 34.1, 36.1; 29/428; 112/475.08
See application file for complete search history.

(56) References Cited

U.S. PATENT DOCUMENTS

| | | | |
|---|---|---|---|
| 6,103,337 A | 8/2000 | Burgess | |
| 6,446,675 B1 | 9/2002 | Goering | |
| 6,814,541 B2 | 11/2004 | Evans et al. | |
| 7,266,941 B2 | 9/2007 | Eleftheriou et al. | |
| 7,334,393 B2 | 2/2008 | Porte | |
| 7,370,467 B2 | 5/2008 | Eleftheriou et al. | |
| 7,770,378 B2 | 8/2010 | Eleftheriou et al. | |
| 7,797,922 B2 | 9/2010 | Eleftheriou et al. | |
| 8,079,387 B2 | 12/2011 | Goering et al. | |
| 2006/0121809 A1 | 6/2006 | Goering | |
| 2008/0206048 A1 | 8/2008 | Coupe et al. | |
| 2009/0202763 A1* | 8/2009 | Rose | B32B 5/024 428/36.1 |
| 2012/0099981 A1 | 4/2012 | Verseux et al. | |

FOREIGN PATENT DOCUMENTS

| | | |
|---|---|---|
| EP | 1 927 732 A | 6/2008 |
| EP | 2 163 748 A | 3/2010 |
| FR | 2 968 364 A | 6/2012 |
| JP | 2012-016926 A | 1/2012 |
| WO | WO 2011/039828 A1 | 4/2011 |
| WO | WO 2011/041355 A1 | 4/2011 |

OTHER PUBLICATIONS

Extended European Search Report for corresponding European application 15169213.4 dated Sep. 23, 2015.
Extended European Search Report for corresponding European application 15169267.0 dated Sep. 15, 2015.
Extended European Search Report for corresponding European application 15169268.8 dated Sep. 17, 2015.
Extended European Search Report for corresponding European application 15169270.4 dated Sep. 16, 2015.

* cited by examiner

CIRCUMFERENTIAL STIFFENERS FOR COMPOSITE FANCASES

BACKGROUND OF THE INVENTION

Field of the Invention

The present invention relates to circumferential stiffeners for composite preforms, and more particularly for manufacturing preforms that may be processed to form fancase preforms for jet aircraft engines.

Incorporation by Reference

All patents, patent applications, documents, references, manufacturer's instructions, descriptions, product specifications, and product sheets for any products mentioned herein are incorporated herein by reference, and may be employed in the practice of the invention.

BACKGROUND OF THE INVENTION

The use of reinforced composite materials to produce structural components is now widespread, particularly in applications where their desirable characteristics are sought, including being light in weight, strong, tough, thermally resistant, self-supporting and adaptable to being formed and shaped.

In this regard, contour woven preforms are used to provide fiber reinforcement in resin transfer molded articles, for example fancases for jet engines. Such preforms are engineered to have a specific cross-sectional shape when they are wound onto an appropriately sized mandrel. These shapes can generally be described as a variable thickness barrel section with an integral flange at either end.

Typically, such preforms consist of fabrics which are woven from materials such as glass, carbon, ceramic, aramid, polyethylene, and/or other materials which exhibit desired physical, thermal, chemical and/or other properties, chief among which is great strength against stress failure. Through the use of such fabrics, which ultimately become a constituent element of the completed composite article, the composite preform imparts the desired characteristics of the fabrics, such as very high strength, into the completed composite article. Usually particular attention is paid to ensure the optimum utilization of the properties for which the fabrics have been selected.

After the desired preform has been constructed, a molding or densifying operation takes place where a resin matrix material may be introduced to and into the woven preform, so that typically the preform becomes encased in the resin matrix material that fills the interstitial areas between the constituent elements of the preform. The resin matrix material may be any of a wide variety of materials, such as epoxy, phenolic, polyester, vinyl-ester, ceramic, carbon and/or other materials, which also exhibit desired physical, thermal, chemical and/or other properties. The materials chosen for use as the resin matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the woven preform and the matrix material may then be cured and stabilized in the same operation by thermosetting or other known methods, and then subjected to other operations toward producing the desired component. It is significant to note at this point that after being so cured, the then solidified mass of the matrix material normally is very strongly adhered to the reinforcing material (e.g., the woven preform). As a result, stress on the finished component, particularly via its matrix material acting as an adhesive between fibers, may be effectively transferred to and borne by the constituent material of the preform.

Fancases for jet engines, such as the example shown in FIG. 1, using contour woven preforms that provide fiber reinforcement, and then impregnated for example by resin transfer molding, are already known in the art. Use of this type of preform offers several advantages, some of which are: provide continuous fiber in the circumferential and axial directions; minimize touch labor through the elimination of cutting and darting; and minimize process waste by eliminating the need for cutting and darting.

SUMMARY OF THE INVENTION

However, while current woven preforms are adequate for many applications, there are situations in which a fancase requires additional circumferential or axial stiffeners at one or more axial locations. Therefore, it would be an advancement in the state of the art to provide a contour woven preform enhanced with intermediate circumferential stiffeners that are used to improve the strength and/or dynamic performance of the preform. When used for a fancase, such stiffeners may also serve as attachment points for the fancase itself or for attaching auxiliary equipment. This disclosure describes several improved preform assemblies that include circumferential stiffeners, as well as methods of manufacturing the same.

One exemplary embodiment of the present invention is a woven preform comprised of one or more wraps of a continuous single-layer or multi-layer fabric to form a barrel-shaped circumference, or a ring, around a centerline of an appropriately designed mandrel. The wraps of fabric can form an integral flange disposed on a first edge of the woven fabric that forms a first edge circumference around the centerline. The wraps of fabric can also form an integral flange disposed on a second edge of the woven fabric that forms a second edge circumference around the centerline.

While the wraps of fabric are described as forming a "barrel-shaped" circumference, the performs are generally configured as a cylinder with cylinder walls that may bulge out, bulge in, or may bulge out in some areas and bulge in at others. Throughout this disclosure, the terms barrel, barrel-shaped, and variations there of, are used in accordance with this description of the variations in the preform shape.

Stiffeners, flanges, or both stiffeners and flanges, may be formed on the outer surface of the preform by at least partially circumferentially wrapping one or more layers of woven fabrics around the preform. Stiffeners may be formed at a location between the first and second fabric edges of the preform; and flanges may be formed at the edges of the preform. One or more circumferential stiffeners may be formed from separate contour woven fabrics and are adjacent to and in contact with, or abutting, the barrel-shaped circumference of the preform around the centerline. One or more circumferential stiffeners and/or one or more flanges may be formed from fabrics comprising stretch broken fibers in the warp direction, the weft direction, or in both the warp and weft directions.

The invention according to one embodiment forms one or more circumferential stiffeners comprised of one or more wraps of a single-layer fabric.

The invention according to one embodiment forms one or more circumferential stiffeners comprised of one or more wraps of a multi-layer fabric.

The invention according to one embodiment forms one or more circumferential stiffeners comprised of one or more layers of contour woven fabric.

The invention according to one embodiment forms one or more circumferential stiffeners comprised of one or more layers of a single or multi-layer woven fabric comprising stretch broken fibers in the warp, weft, or warp and weft directions.

The invention according to one embodiment further comprises a preform with one or more circumferential stiffeners wherein one or more lengths of woven material are inserted at a bias between layers of the contour woven fabric.

The invention according to one embodiment further comprises a preform with one or more circumferential stiffeners affixed to the preform prior to molding, and the stiffener sections and/or the preform layers themselves reinforced through T-forming (see U.S. Pat. No. 6,103,337, the content of which is which is incorporated herein by reference), tufting, stitching or other techniques known to those in the art.

The invention according to one embodiment comprises woven fabrics made from material selected from the group consisting of aramid, carbon, nylon, rayon, polyester, and glass fibers.

One exemplary embodiment of the present invention is a woven preform, suitable, for example, for a composite fancase, with a first sub-preform comprising one or more wraps of a continuous woven fabric to form, for example, a barrel-shaped circumference, or ring, around a centerline of an appropriately designed mandrel. The wraps of fabric can form an integral flange disposed on a first edge of the woven fabric that forms a first edge circumference around the centerline. The wraps of fabric can also form an integral flange disposed on a second edge of the woven fabric that forms a second edge circumference around the centerline. At least two second, or outer, sub-preforms are formed on the substantially barrel-shaped circumference of the first sub-preform. Each of the second sub-preforms is comprised of one or more wraps of a continuous woven fabric to form at least one barrel-shaped circumference around the centerline of the first sub-preform. The wraps of fabric of the second sub-preforms can form a first outer sub-preform integral flange disposed on a first edge of the outer sub-preform fabric that forms a first edge circumference around the centerline, as well as a second outer sub-preform integral flange disposed on a second edge of the outer sub-preform woven fabric that forms a second edge circumference around the centerline. The substantially barrel-shaped circumference of each outer, or second, sub-preform wraps around the first sub-preform's substantially barrel-shaped circumference. The second sub-preform integral flanges may form integral stiffeners. Second sub-preform integral flanges may be in contact with, or abutting, other flanges and may, in combination, be considered integral stiffeners.

The invention according to one embodiment forms one or more circumferential stiffeners from the flanges of adjacent second sub-preforms. According to some embodiments, lengths of woven material may be inserted at a bias between adjacent flanges of some of the sub-preforms.

The invention according to one embodiment has the first sub-preform assembled before the outer sub-preforms are assembled to be in contact with the first sub-preform's substantially barrel-shaped circumference.

The invention according to one embodiment has the first sub-preform assembled and molded before the outer sub-preforms are assembled to be in contact with the first sub-preform's substantially barrel-shaped circumference.

One exemplary embodiment of the present invention provides a woven preform comprising a sub-preform of one or more wraps of a continuous single-layer or multi-layer woven fabric to form a substantially barrel-shaped circumference around a centerline. The wraps can form a first integral flange disposed on a first edge of the woven fabric that forms a first edge circumference around said centerline and can form a second integral flange disposed on a second edge of the woven fabric that forms a second edge circumference around the centerline. Intermediate stiffeners may be comprised of one or more wraps of a continuous single-layer or multi-layer woven fabric forming intermediate stiffeners about the substantially barrel-shaped circumference around the centerline. The layers of woven fabric forming the intermediate stiffeners wrap may have a first intermediate stiffener integral flange disposed on a first edge of the intermediate stiffener wrap of woven fabric and a second intermediate stiffener integral flange disposed on a second edge of the intermediate stiffener wrap of woven fabric that forms a second edge circumference around the centerline. The intermediate stiffener wraps may incorporate one or more intermediate stiffeners disposed between the first intermediate stiffener integral flange and the second intermediate stiffener integral flange. The layers of woven fabric that form the intermediate stiffeners wrap barrel-shaped circumference wraps around the sub-preform barrel-shaped circumference.

The invention according to one embodiment further comprises a preform with one or more circumferential stiffeners affixed to the preform prior to molding, and the stiffener sections and/or the preform layers themselves reinforced through T-Forming, tufting, stitching, or other techniques known to those in the art.

An embodiment of the invention forms a composite fancase comprising one or more wraps of a continuous single-layer or multi-layer woven fabric to form a substantially barrel-shaped circumference around a centerline of an appropriately designed mandrel. The wraps may have a first integral flange disposed on a first edge of the woven fabric that forms a first edge circumference around the centerline and may have a second integral flange disposed on a second edge of the woven fabric that forms a second edge circumference around the centerline. An outermost wrap of the multi-layer woven fabric may be bifurcated in the outer surface layer, and the bifurcated outer surface layer may be folded up to make a stiffener. The bifurcation of the outermost wrap of the outermost layer may be made in the warp direction or in the weft direction to provide stiffeners in the circumferential or axial direction, respectively.

The invention according to one embodiment forms one or more stiffeners that are oriented axially with the centerline.

The invention according to one embodiment forms one or more stiffeners that are oriented circumferentially with the centerline.

The invention according to one embodiment forms one or more circumferential stiffeners that are in contact with the substantially barrel-shaped circumference.

An embodiment of the invention includes a method of manufacturing a woven preform comprising the steps of wrapping a continuous single-layer or multi-layer woven fabric one or more times around a centerline to form a circumference around the centerline, and wrapping one or more circumferential stiffeners around the continuous woven fabric so that the circumferential stiffeners form a circumference around the centerline.

The invention according to one embodiment further comprises a preform with one or more circumferential stiffeners affixed to the preform prior to molding, and the stiffener sections and/or the preform layers themselves are reinforced through T-Forming, tufting, stitching, or other techniques known to those in the art.

The invention according to one embodiment molds the continuous woven fabric after it has been wrapped one or more times around a centerline to form a circumference around the centerline.

The invention according to one embodiment co-molds one or more circumferential stiffeners with the continuous woven fabric after they have been wrapped one or more times around a centerline to form a circumference around the centerline.

The invention according to one embodiment molds circumferential stiffeners onto the molded continuous woven fabric.

An embodiment of the invention includes a method of manufacturing a woven preform comprising the steps of wrapping a continuous single-layer or multi-layer woven fabric one or more times around a centerline to form a circumferential surface around the centerline, and at least partially wrapping one or more circumferential stiffeners upon the circumferential surface to form an arc around the centerline.

An embodiment of the invention includes a method of manufacturing a woven preform comprising the steps of wrapping a continuous single-layer or multi-layer woven fabric one or more times around a centerline to form a first sub-preform that forms a circumference around the centerline, wherein the first sub-preform may have a first integral flange disposed on a first edge of the woven fabric that forms a first edge circumference around the centerline and may have a second integral flange disposed on a second edge of the woven fabric that forms a second edge circumference around the centerline, wrapping one or more additional sub-preforms that have a first outer sub-preform integral flange disposed on a first edge of the outer sub-preform woven fabric that forms a first edge circumference around the centerline and a second outer sub-preform integral flange disposed on a second edge of the outer sub-preform woven fabric that forms a second edge circumference around the centerline, and forming integral stiffeners by aligning each adjacent outer sub-preform integral flange so that the adjacent outer sub-preform integral flanges are in contact with, or abutting, each other.

An embodiment of the invention includes a method of manufacturing a woven preform comprising the steps of wrapping a continuous single-layer or multi-layer woven fabric one or more times around a centerline to form a sub-preform that forms a circumference around the centerline, wherein the sub-preform may have a first integral flange disposed on a first edge of the woven fabric that forms a first edge circumference around the centerline and may have a second integral flange disposed on a second edge of the woven fabric that forms a second edge circumference around the centerline, forming intermediate stiffeners in an intermediate stiffener wrap, and wrapping the intermediate stiffener wrap around the sub-preform.

An embodiment of the invention includes a method of manufacturing a woven preform comprising the steps of wrapping a continuous single-layer or multi-layer woven fabric one or more times around a centerline to form a circumference around the centerline, bifurcating the outermost layer of the outermost wrap of the single-layer or multi-layer woven fabric, and folding the bifurcated layers to make a circumferential stiffener.

Therefore, an object of the invention is to provide woven preform assemblies incorporating circumferential stiffeners useful, for example, in forming jet engine fancases.

An additional object of the invention is to provide methods of manufacturing the woven preform assemblies incorporating circumferential stiffeners, useful, for example, in forming jet engine fancases.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in US Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

Figure 1:
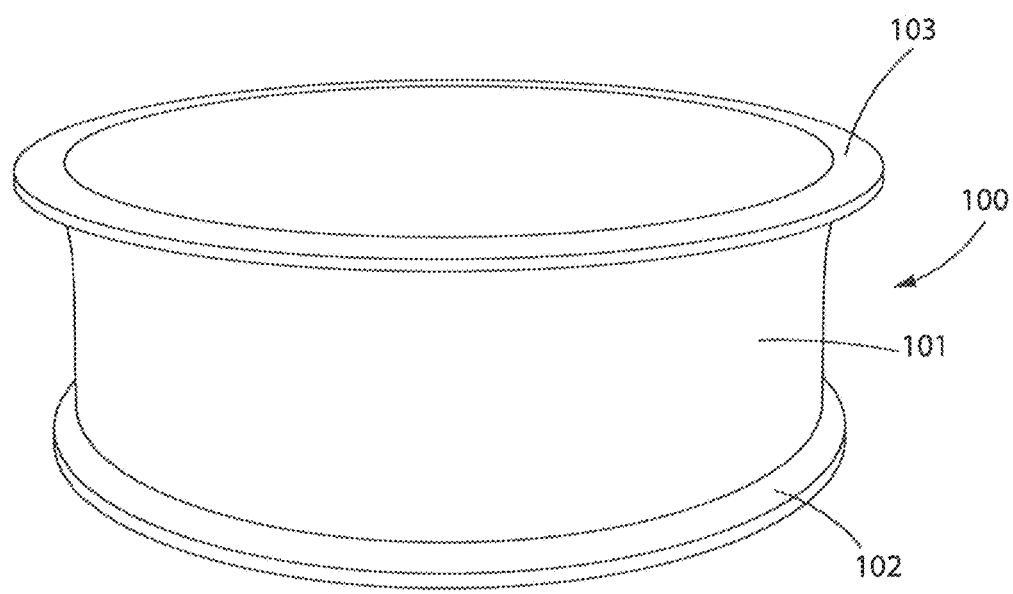
FIG. 1 shows a known prior art fancase fabricated using a contour woven fiber preform.

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "upper," "lower," "top" and "bottom" and the like are words of convenience and are not to be construed as limiting terms.

Figure 7:
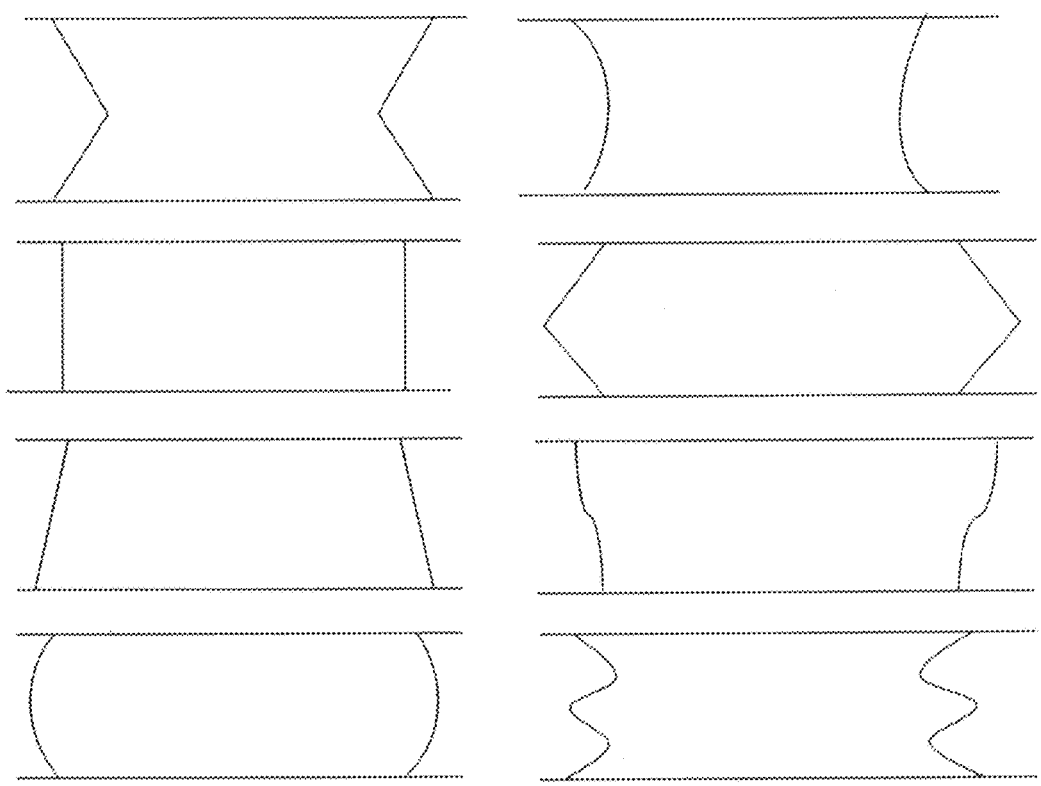
FIG. 7 shows various shapes of woven preforms that may be produced according to the embodiments of the present invention.

As described herein, circumferential stiffeners are incorporated into an assembly of woven preforms, often suitable for use as composite fancases for jet engines, which are generally cylindrical or substantially "barrel shaped". While the assembly of woven preforms is described as "barrel-shaped", the preforms are generally configured as a cylinder with a cylinder wall that may bulge out, bulge in, or may bulge out in some areas and bulge in at others, such as those shown in FIG. 7, for example. Throughout this disclosure, the terms barrel, barrel-shaped, and variations there of, are used in accordance with this description of the variations in the preform shape.

In other words, the fancases have a center line and the woven preform assemblies, also comprising the circumferential stiffeners, make a circumference around the center line of an appropriately designed mandrel for fabrication of the fancase. These stiffeners provide increased strength to the fancase and can also provide attachment points for mounting other pieces of equipment to the fancase by, for example, bolting such equipment to the circumferential stiffener. Additionally, such stiffeners may also be used for mounting the fancase to, for example, structural components. The assembly of woven preforms with circumferential stiffeners may be useful as fancase preforms for jet aircraft engines.

Turning to the figures, FIG. 1 shows a prior art fancase (100) fabricated using a known contour woven fiber preform. The fancase (100) of FIG. 1 includes a substantially barrel-shaped body (101). The barrel-shaped body (101) may include barrel sections of variable thickness. At either end of the barrel-shaped body (101) are integral flanges (102) and (103) that are formed from the woven preform. The path of the warp fibers (running in the circumferential direction) are engineered to have the proper lengths in the final shaped configuration without the need for cutting and darting. These integral flanges provide circumferential stiffening of the preform. However, while the fancase (100) of FIG. 1 is adequate for many applications, there are also times where it is desirable or necessary to incorporate additional circumferential stiffeners at one or more axial locations. Such additional circumferential stiffeners are used to improve the strength and/or dynamic performance of the fancase. Additionally, circumferential stiffeners may serve as attachment points, for example for auxiliary equipment.

Figure 2:
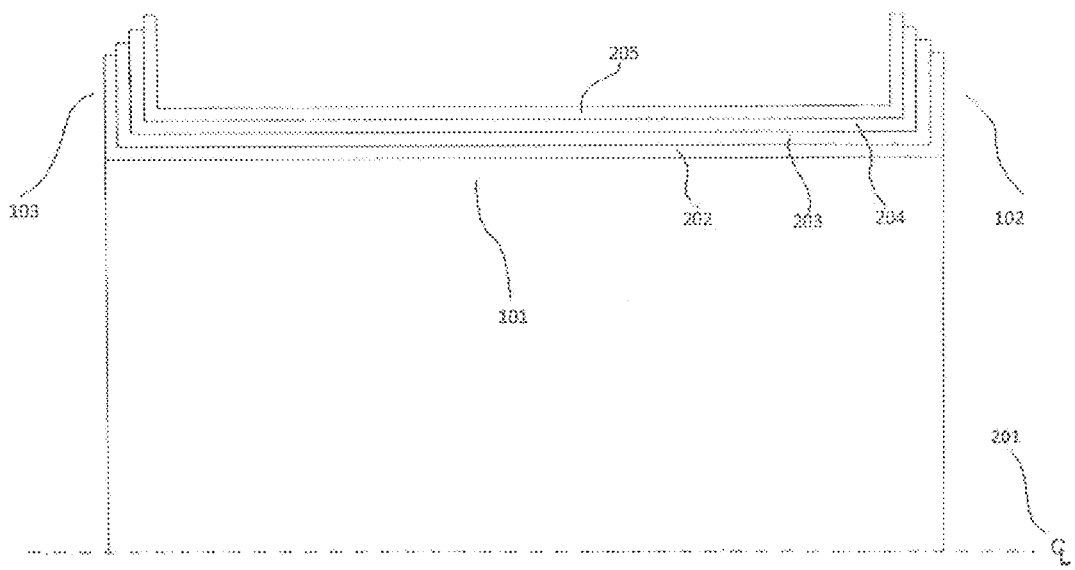
FIG. 2 shows a schematic of a known prior art contour woven fancase preform.

FIG. 2 is a schematic, or partial cross-section of a prior art fancase preform, like that of FIG. 1, which exemplifies current technology. For convenience, only one half of the preform is shown and the barrel section is illustrated with a constant thickness. In FIG. 2, a cross section of the preform is shown consisting of four continuous wraps (202), (203), (204), and (205) of woven fabric that trace a circumference around centerline (201) of an appropriately designed mandrel. In other words, in FIG. 2 the end of the first wrap (202) connects to the beginning of the second wrap (203), the end of the second wrap (203) connects to the beginning of the third wrap (204), the end of the third wrap (204) connects to the beginning of the fourth wrap (205), etc. Additionally, this fabric does not have to be a uniform thickness and the body (101) of the preform between the flanges (102), (103) does not have to be cylindrical (e.g., can be substantially barrel-shaped or other shapes shown in FIG. 7, for example). While FIG. 2 shows four wraps of this continuous woven fabric, a final preform may have any number of wraps.

Typically, the fabrics used for such preforms are woven on a loom fitted with a special takeup system that allows warp fibers to have different lengths. The warp fibers are in the circumferential direction of the fancase. The paths of the warp fibers are engineered to have the proper lengths in the final shaped configuration without the usual need for any cutting and/or darting, resulting in a contour woven fabric. The fabric may be single-layer or multi-layer.

Fibers or yarns typically used to weave the fabrics for such preforms may comprise one or more materials selected from the group consisting of aramid, carbon, nylon, rayon, polyester, and glass fiber.

Embodiments of the invention may be useful in the fabrication of fancases for jet engines, typically used in aircraft. In the following discussion, the preform assembly may be referred to as a fancase preform as an illustrative use for the inventive preform assembly, not as a limitation. One of ordinary skill in the art will recognize other uses for the disclosed woven preform assemblies which would take advantage of the enhanced performance characteristics provided by the inventive preform assembly.

Figure 3:
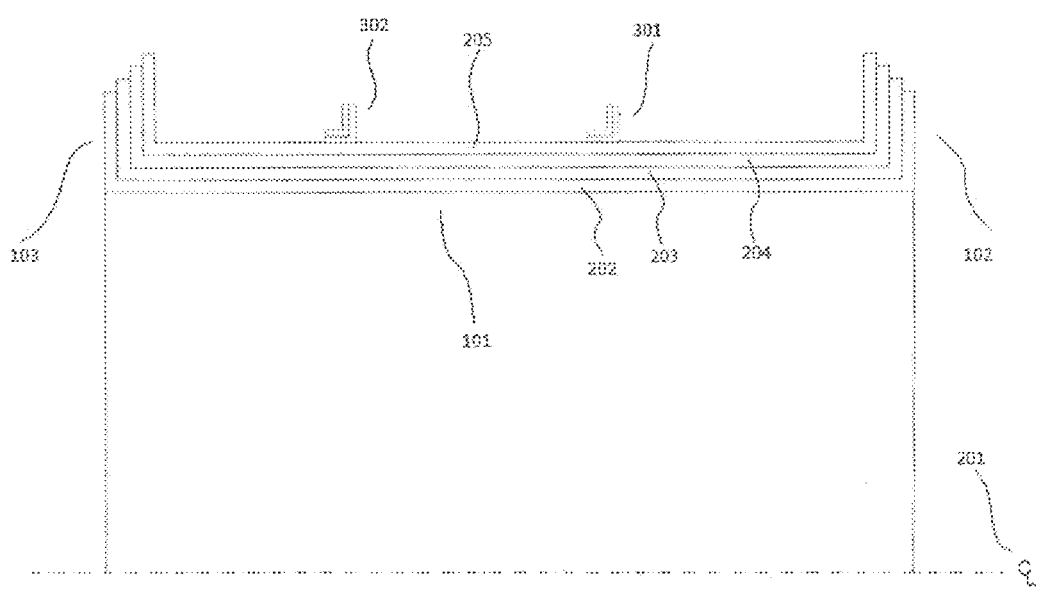
FIG. 3 shows an assembly of contour woven stiffeners added to a woven preform according to an embodiment of the invention.

An embodiment provides a preform assembly by a method of adding additional circumferential stiffeners to a contour woven preform assembly. In this embodiment, layers of woven fabric are wrapped around an appropriately designed mandrel to form a fancase preform like that shown in FIG. 2. An example of this is shown schematically in FIG. 3, which also depicts two single- or multi-layer woven fabrics at least partially wrapped around the circumference of the wraps of the contour woven fabric, forming circumferential stiffeners (301) and (302). The quantity, relative shapes, and sizes of such woven circumferential stiffeners are not intended to be limited by the exemplary schematic in FIG. 3. The individual circumferential stiffeners need not be similar in shape or size to one another. Also, the body (101) of the preform between the flanges (102), (103) does not have to be cylindrical and can have a substantially barrel shape (101). It can also be of non-uniform thickness.

The woven fabric used to form the stiffeners (301), (302) may be a contour woven fabric in which the length of the warp fibers can be varied across the width of the fabric. The varied lengths are engineered to allow the stiffener to be positioned in its final shaped configuration.

In other embodiments, the fabric used to form the stiffeners (301), (302) is composed of stretch broken (SB) fibers in at least the warp (circumferential) direction of the stiffener. However, these SB fibers, for example, carbon, may also be used in the weft (axial) direction, or both. The stretch broken fibers also allow the stiffener to be positioned in its final shaped configuration.

The circumferential stiffeners (301), (302) may be built up using multiple wraps of a single-layer fabric, or perhaps a lesser number of wraps when using a multi-layer woven fabric. Regardless of this, the circumferential stiffeners can be wound onto/over the dry base preform already on the mandrel and co-molded, or they can be wound onto a molded fancase preform already on the mandrel and molded in a secondary operation forming the final composite.

The circumferential stiffeners (301), (302) may include lengths of additional woven material that is inserted between the layers of the woven fabric if desirable, as it is wound about the circumference of the preform base such that the yarns of the inserted material are at an angle of orientation (on a bias) to the yarns of the fabric layers forming the stiffeners. Such "bias" fabrics could also be inserted between the wraps of fabric (202-205) as they are wound about the mandrel. Furthermore, additional through-thickness reinforcement of the preform assembly can be provided by, for example, T-forming, tufting, or stitching through the stiffeners themselves and/or to attach the stiffener layers (301, 302) to the preform layers (202-205) prior to molding and resin impregnation. The circumferential stiffeners (301), (302) may extend only partially around the circumference of the fancase preform (100). Partially extending stiffeners (301), (302) may also be T-formed, tufted, or stitched through the layers themselves or onto the dry base fancase preform prior to molding to provide through thickness reinforcement to the body (101) of the preform (100).

In addition, the stiffeners can be complete circumferential rings, or they may be only arc segments that do not wrap around the full circumference of the preform, or they may be a combination of complete circumferential rings and are segments. For example, arc segments are a beneficial option when the circumferential stiffeners are used for equipment mounting points that do not require full circumferential rings. In this case, the preform assembly will also comprise sections of the woven fabric that are cut to length and may be stacked on top of one another, to the extent necessary, to build up the thickness of the are segment.

Thus, the circumferential stiffeners can be multiple wraps of a single-layer fabric, multiple wraps of a multi-layer fabric, full circumferential rings, partial stiffeners (i.e., arcs), and they may be wound onto the circumferential surface of the contour woven base preform, with or without T-forming, tufting or stitching, and co-molded. Alternately they may be wound onto the circumferential surface of the already molded preform base, and molded in a secondary operation forming the final composite. Different fabrics may also be selected for each circumferential stiffener, and the fabrics forming the circumferential stiffeners and the base preform need not be the same type of fabric. Additionally, the fabrics used do not have to be a uniform thickness, but may have thicker or thinner regions as required.

Figure 4:
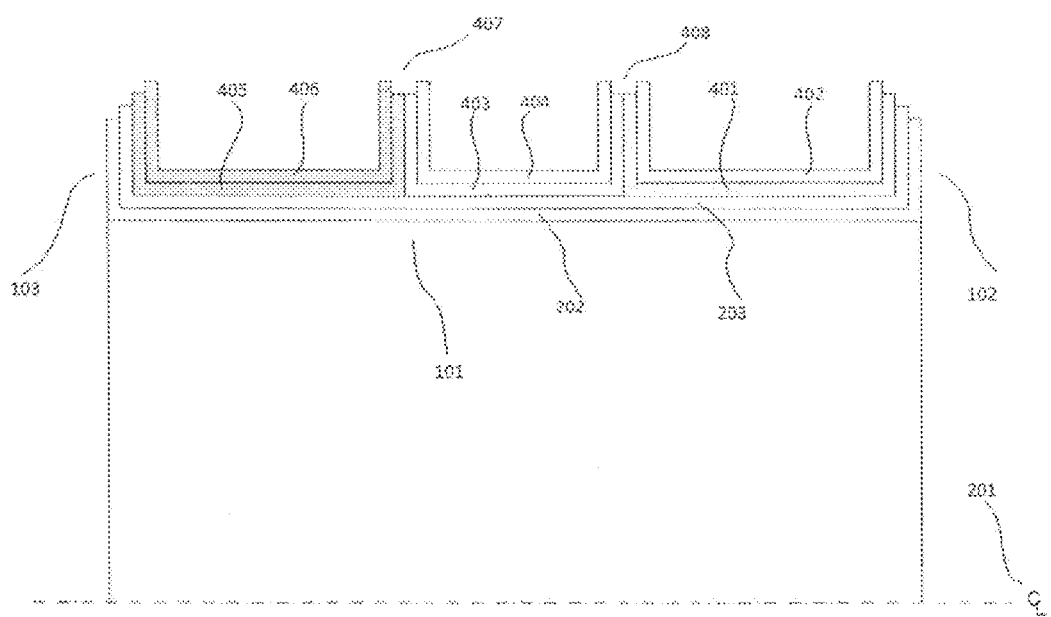
FIG. 4 shows stiffeners formed by combining multiple sub-preforms with the woven preform according to an embodiment of the invention.

Another embodiment of a composite fancase with additional circumferential stiffeners is shown in FIG. 4, which shows an exemplary embodiment that uses several woven sub-preforms, each of which may include one or more wraps around an appropriately designed mandrel. The woven sub-preforms may be formed from a fabric at least partially woven from stretch-broken fibers or yarns or may be formed from contour woven fabric. In FIG. 4, the first sub-preform includes wraps (202) and (203) of a contour woven fabric around an appropriately designed mandrel. Outer sub-preforms include multiple wraps of woven fabrics as demonstrated by a second sub-preform including wraps (401) and (402), a third sub-preform including wraps (403) and (404), and a fourth sub-preform including wraps (405) and (406).

All of the sub-preforms are fabricated and combined to make the final fancase preform assembly. Each of these sub-preforms consists of a base section with integral flanges and/or stiffeners at either end. An integral stiffener is one whose layer or layers have through fibers connecting it to the base. An intermediate stiffener is located in one or more locations between the end flanges. Intermediate stiffeners may be integral or not. The number of wraps used for any or all of the sub-preforms can be varied, and are not intended to be limited by the exemplary schematic shown in FIG. 4. Similarly, the relative shapes and sizes of such contour woven fabric sub-preforms are not intended to be limited by the exemplary schematic in FIG. 4. Additionally, the woven fabrics used do not have to be a uniform thickness, but may have thicker or thinner regions as desired. Also, the body (101) of the preform between the flanges (102), (103) does not have to be perfectly cylindrical (e.g., can be substantially barrel-shaped or any shape shown in FIG. 7, for example) or of uniform thickness. Different fabrics may also be selected for each sub-preform.

In this embodiment, the first sub-preform containing wraps (202) and (203) is very similar to the basic preform shown in FIG. 2, except that it does not have as many wraps and only accounts for part of the full thickness of the preform. Two or more other sub-preforms, called outer sub-preforms—such as those in FIG. 4 that include wraps (401) and (402), wraps (403) and (404), and wraps (405) and (406)—are wound over the first sub-preform that includes wraps (202) and (203). Thus, the combination of all of the sub-preforms completes the full thickness of the substantially barrel-shaped body (101) of the preform assembly, as well as the thickness of the integral flanges (102) and (103) that are formed by those sub-preforms whose integral flanges are aligned on an outer edge. The other integral flanges of these sub-preforms combine to make the integral stiffeners (407) and (408) that are disposed between the integral flanges (102) and (103) on the barrel-shaped body (101) of the preform assembly. Circumferential stiffeners like those described in the first embodiment and illustrated in FIG. 3 may also be incorporated into this embodiment.

Lengths of woven material (not shown) may be placed between the integral flanges of any of the sub-preforms illustrated, for example, in FIG. 4. For example, one or more lengths of woven material may be placed between the integral flanges formed by wraps 405 and 406 in one outer sub-preform. One or more lengths of woven material may also be placed between wraps 403 and 405 of adjacent outer sub-preforms, or between wrap 405 and integral flange 103 of the first sub-preform, or between flange 102 and wrap 401. These reinforcement layers therefore can be placed between the layers of any of the wraps 101-406, and within any of the layers forming the flanges 102, 103, 407, and 408. These additional woven layers are inserted such that the yarns of the inserted material are at an angle of orientation greater than 0 degrees and less than 90 degrees (i.e., on a bias) to the yarns of the fabric layers forming the stiffeners or sub-preforms. Furthermore, additional through-thickness reinforcement of the preform assembly can be provided by, for example, T-forming, tufting, or stitching through the stiffeners (407-408) and the bias fabrics themselves, the flange layers (102-103), and/or to attach the stiffener layers to the preform layers (202-203) prior to molding and resin impregnation. The fabrics forming the stiffeners may alternatively be wound or placed onto the circumferential surface of the already molded preform base, and molded in a secondary operation, forming the final composite.

The widths of the base sections for each sub-preform and outer sub-preforms can be designed to position the integral stiffeners at their desired axial locations. One or more integral stiffeners can be formed, based on the number of outer sub-preforms used. Additionally, and similar to the previous embodiments, all of the sub-preforms can be assembled and molded in one operation. Alternately, the outermost sub-preforms can be wrapped or placed onto the circumference of a molded base preform already on a mandrel and molded in a secondary operation forming the final composite.

Figure 5:
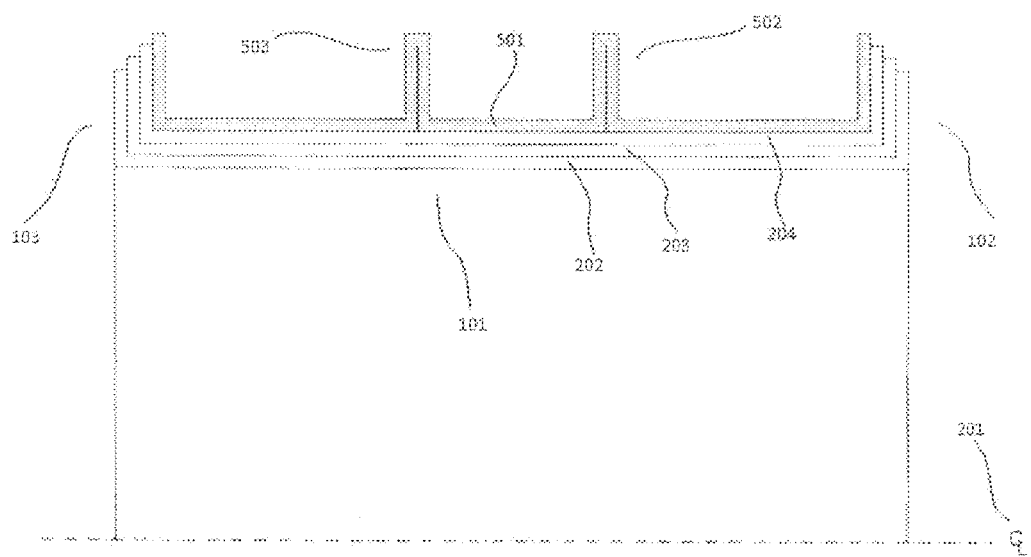
FIG. 5 shows multiple stiffeners in a single sub-preform formed according to an embodiment of the invention.

An additional embodiment is shown in FIG. 5. In this non-limiting example, the base preform is a sub-preform that includes three wraps (202), (203), and (204) about an appropriately designed mandrel of a single-layer or multi-layer contour woven fabric with flanges at each end. An additional wrap, called the intermediate stiffener wrap, forms a sub-preform (501) which incorporates one or more intermediate stiffeners (502) and (503). The intermediate stiffener wrap is incorporated into a single fabric that provides the last wrap of the complete preform. Sub-preform 501 may be formed from a contour woven fabric, or may be formed from a fabric at least partially woven from stretch-broken fibers. This sub-preform (501) is wound onto the base sub-preform wraps (202), (203), and (204)—which generally provide the majority of the material for the preform assembly—and thus completes the preform. The quantity, relative shapes, and sizes of such intermediate stiffeners are not intended to be limited by the exemplary schematic in FIG. 5.

Lengths of woven material (not shown) may be placed between the integral flanges of the sub-preform 501 and the flanges of the barrel shaped body 101 as illustrated, for example, in FIG. 5. For example, one or more lengths of woven material may be placed between the integral flanges formed in the intermediate stiffener wrap preform 501 and flange layer 102 of the barrel shaped body 101. Similarly, one or more lengths of woven material may be placed between the integral flanges formed in the intermediate stiffener wrap preform 501 and flange layer 103 of the body 101. In some embodiments, one or more lengths of woven material may also be placed within the folds of one or more intermediate stiffeners (502) and (503).

These additional woven layers are inserted such that the yarns of the inserted material are at an angle of orientation greater than 0 degrees and less than 90 degrees (i.e., on a bias) to the yarns of the fabric layers forming the flanges or stiffeners. Furthermore, additional through-thickness reinforcement of the preform assembly can be provided by, for example, T-forming, tufting, or stitching through the intermediate stiffeners (502,503) and the woven fabrics themselves, the flange layers (102-103), and/or attach the stiffener layers to the preform layers (202-203) prior to molding and resin impregnation. The fabrics forming the stiffeners may alternatively be wound or placed onto the circumferential surface of the already molded preform base, and molded in a secondary operation forming the final composite.

The number of wraps used for sub-preform can be varied, and are not intended to be limited by the exemplary schematic shown in FIG. 5. Additionally, the fabrics used do not have to be a uniform thickness, but may have thicker or thinner regions as desired. Also, the body (101) of the preform between the flanges (102), (103) does not have to be perfectly cylindrical, but can be substantially barrel-shaped. Different types of fabrics may also be selected for the sub-preform and the intermediate stiffener wrap. Circumferential stiffeners like those described in the first embodiment may also be incorporated into this embodiment.

Figure 6:
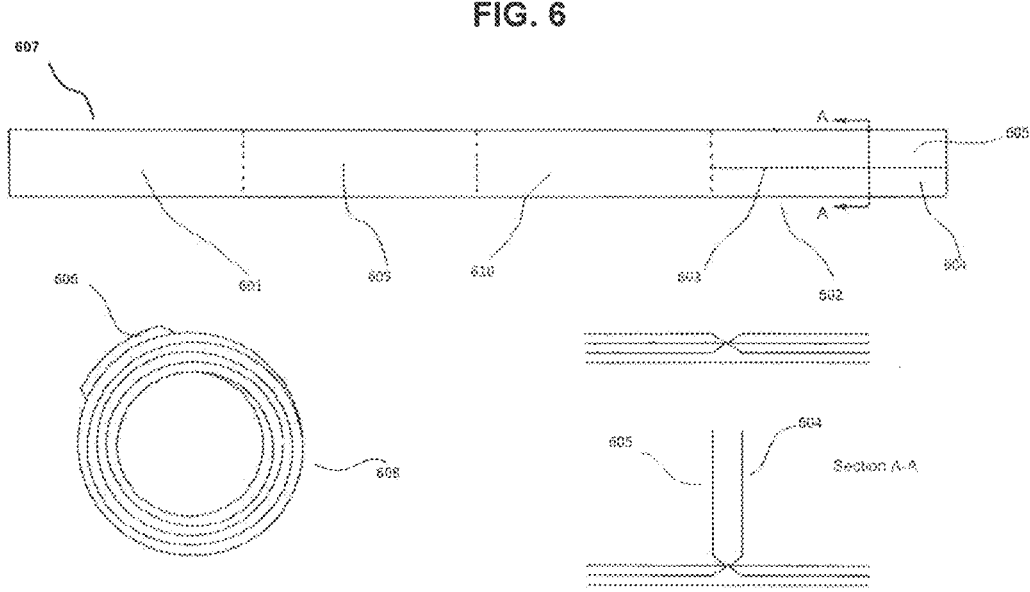
FIG. 6 shows an integral stiffener formed by bifurcating the outermost layer of the outermost wrap of one of the multi-layer fabrics used to form a woven preform according to an embodiment of the invention.

Another embodiment is illustrated in FIG. 6, which introduces a bifurcation (603) of the outermost layer of the outermost wrap (602) of the multi-layer woven fabric. As with the prior art embodiment in FIG. 2, the preform is constructed with a number of continuous wraps of woven fabric (607) that is wrapped one or more times about an appropriately designed mandrel to construct the preform assembly (608). FIG. 6 shows four wraps of fabric starting with an innermost wrap (601), intermediate wraps (609) and (610), and an outermost wrap (602). The outermost wrap (602) includes bifurcated portions (604) and (605) that are formed in the outer layer of the outermost wrap. The outer layer of the outermost wrap may be bifurcated in the warp direction. The bifurcated layer of said outer surface layer is then folded up to make a circumferential stiffener. The circumferential stiffener can act as an attachment point for bolting a piece of equipment to the molded preform assembly when used as a fancase, as an example. The stiffener may encompass only an arc segment around the circumference (606), or the wrap may be formed long enough to allow a full circumferential ring round the fancase preform.

The bifurcation (603) may also be made in the weft direction, in a manner that allows for axial stiffeners or attachment points as well. In such a case, the bifurcation would be made in the weft, rather than the warp, direction of the single-layer or multi-layer fabric. As above, the outermost layer is folded up to make an axial stiffener.

The number of wraps used can be varied, and are not intended to be limited by the exemplary schematic shown in FIG. 6. Additionally, the fabrics used do not have to be a uniform thickness, but may have thicker or thinner regions as required. Also, the body (e.g., (101) in FIG. 2) of the preform created with the embodiment shown in FIG. 6 that is between the flanges (e.g., (102) and (103) in FIG. 2) does not have to be perfectly cylindrical, but can be substantially barrel-shaped. Nor does it have to be of uniform thickness. Circumferential stiffeners like those described in the first embodiment may also be incorporated into this embodiment.

Lengths of woven material (not shown) may be placed between the bifurcated portions (604, 605) when the bifurcated portions are folded to form a stiffener as illustrated in FIG. 6. For example, one or more lengths of woven material may be placed between the bifurcated portions (604, 605) as illustrated in section A-A of FIG. 6. These additional woven layers are inserted such that the yarns of the inserted material are at an angle of orientation greater than 0 degrees and less than 90 degrees (i.e., on a bias) to the yarns of the bifurcated fabric layers forming the stiffeners. Furthermore, additional through-thickness reinforcement of the preform assembly can be provided by, for example, T-forming, tufting, or stitching through the stiffeners (604, 605) and the woven fabrics themselves, prior to molding and resin impregnation. The assembly is then molded into the final composite.

In all the embodiments, once the preform assembly is formed, resin is infused into the preform assembly (in one or two steps as indicated) by one of the methods known to those skilled in the art, and cured. The infusion of resin, known as a molding or densifying operation, introduces a matrix material to and into the woven preform, so that the resin matrix fills, or substantially fills, the interstitial areas between the components of the preform, encasing the components and the preform. The resin matrix material may be any of a wide variety of materials, such as epoxy, phenolic, polyester, vinyl-ester, ceramic, carbon and/or other materials, which also exhibit desired physical, thermal, chemical and/or other properties. The materials chosen for use as the resin matrix may or may not be the same as that of the reinforcement preform and may or may not have comparable physical, chemical, thermal or other properties. Following the molding process, the composite is then removed from the mandrel, and any finishing operations, such as trimming or polishing, etc., are performed.

Thus, by the present invention, its objects and advantages are realized, and although preferred embodiments have been disclosed and described in detail herein, its scope and objects should not be limited thereby; rather its scope should be determined by that of the appended claims.

What is claimed is:

1. A woven fancase comprising:
   a preform base comprised of a contour woven fabric continuously wrapped around a centerline, the preform base having a circumferential base surface about the centerline and a first flange on a first edge of the base surface and a second flange on a second edge of the base surface;

an intermediate stiffener wrap comprised of a wrap of contour woven fabric about the centerline that forms an intermediate stiffener wrap around the circumferential base surface, the intermediate stiffener wrap having an intermediate stiffener base in contact with said circumferential base surface and is a single fabric that provides the last wrap of the complete preform, wherein said intermediate stiffener wrap has a first intermediate stiffener flange disposed on a first edge of said intermediate stiffener base abutting said first flange and second intermediate stiffener flange disposed on a second edge of said intermediate stiffener base abutting said second flange, wherein said intermediate stiffener wrap incorporates one or more intermediate additional stiffeners disposed between said first intermediate stiffener flange and said second intermediate stiffener flange.

2. The fancase of claim 1, wherein said preform base woven fabric is made from materials selected from the group consisting of carbon, nylon, rayon, polyester, glass, ceramic, aramid, and polyethylene.

3. The fancase of claim 1, wherein said intermediate stiffener woven fabric is made from materials selected from the group consisting of carbon, nylon, rayon, polyester, glass, ceramic, aramid, and polyethylene.

4. The fancase of claim 1, wherein said fabric may be selected from the group consisting of single-layer fabric and multi-layer fabric.

5. The fancase of claim 1, wherein said preform base and said intermediate stiffener wrap is co-molded.

6. The fancase of claim 1, wherein said intermediate stiffener wrap is affixed to said preform base by T-forming, tufting, or stitching.

7. The fancase of claim 1, further comprising one or more lengths of woven material inserted at a bias between said preform base and said intermediate stiffener wrap.

8. The fancase of claim 1, further comprising lengths of woven material inserted at a bias between at least one of said first intermediate stiffener flange and said first intermediate stiffener flange and said second intermediate stiffener flange and said second intermediate stiffener integral flange.

9. A method of forming a woven fancase, comprising:
continuously wrapping a contour woven fabric around a centerline to form a preform base having a circumferential base surface about the centerline and a first flange on a first edge of the base surface and a second flange on a second edge of the base surface;

continuously wrapping a contour woven fabric around the centerline to form an intermediate stiffener wrap around the circumferential base surface, the intermediate stiffener wrap having an intermediate stiffener base in contact with said circumferential base surface, and is a single fabric forming the last wrap of the complete preform, wherein said intermediate stiffener wrap has a first intermediate stiffener flange disposed on a first edge of said intermediate stiffener base abutting said first flange and second intermediate stiffener flange disposed on a second edge of said intermediate stiffener base abutting said second flange, wherein said intermediate stiffener wrap incorporates one or more intermediate stiffeners disposed between said first intermediate stiffener flange and said second intermediate stiffener flange.

* * * * *